Jan. 18, 1955     L. SCHLECHT ET AL     2,700,062
NEGATIVE ELECTRODE FOR ACCUMULATORS
WITH ALKALINE ELECTROLYTES
Filed March 9, 1951

INVENTORS:
LEO SCHLECHT
KARL ACKERMANN
BY
ATT'YS

United States Patent Office 2,700,062
Patented Jan. 18, 1955

2,700,062

NEGATIVE ELECTRODE FOR ACCUMULATORS WITH ALKALINE ELECTROLYTES

Leo Schlecht, Ludwigshafen (Rhine), and Karl Ackermann, Mannheim, Germany, assignors to Badische Anilin- & Soda-Fabrik Aktiengesellschaft, Ludwigshafen am Rhine, Germany Application March 9, 1951, Serial No. 214,825

Claims priority, application Germany April 20, 1950

14 Claims. (Cl. 136—28)

This invention relates to improvements in the production of negative electrodes for accumulators with alkaline electrolytes.

For the production of electrodes of the said kind it is known to prepare a porous iron body by sintering iron powder and to introduce active mass, preferably cadmium, into the pores. During long use, such electrodes gradually lose their mechanical strength because during charging and discharging they are subjected to chemical reactions and a loosening of the metallic body to soft, spongy metal takes place by reason of alternate oxidation and reduction.

It has therefore been proposed to coat the pore walls of the iron electrodes with a layer of nickel by impregnation with a nickel salt solution followed by a heat treatment in a current of hydrogen, or to provide the porous iron mass with parts which are impervious or substantially impervious to attack, as for example with a grating of a nickel-iron alloy. During the charging and discharging of the accumulator, however, the metallic iron body beneath the nickel layer or by the side of the parts of nickel-iron alloy is attacked by oxidation and this impairs the mechanical strength of the electrodes.

If, according to another known proposal, the negative electrodes for alkaline accumulators are made, not of iron, but of porous copper or nickel or an alloy of these two metals, the cost of production of the accumulators is increased by the employment of these more expensive metals. Furthermore the stability to corrosion of such bodies is in many cases not satisfactory, this is especially true with nickel metal if impregnated with cadmium nitrate, and with copper metal if impregnated with cadmium chloride.

We have now found that electrode bodies which are very stable mechanically can be obtained in a simple manner by preparing the sinter body from nickel-iron. It is preferable to start from a mixture of iron powder and nickel powder and to heat the mixture to such temperatures that the individual particles form a porous body and by diffusion a porous nickel-iron alloy is produced. In order to facilitate the formation of the alloy, nickel and iron powders having not too coarse grains are employed. It is advantageous to employ as initial material a nickel-iron powder which has been obtained by thermal decomposition of a mixture of nickel carbonyl and iron carbonyl. It is also possible to employ the metals nickel and iron in the form of their oxides and to subject these first to a reducing treatment. In this case, however, too strong a shrinkage of the sintered article and the formation of cracks readily take place, and it is therefore preferable to employ one of the two metals in the form of oxide and the other in the form of metal, and to carry out the sintering in a reducing atmosphere, preferably in a current of hydrogen, at a slowly increasing temperature.

An intimate mixture of nickel and iron and a resulting rapid alloy formation during the sintering is also obtained by precipitating a mixture of nickel hydroxide and iron hydroxide from an aqueous solution containing both nickel salt and iron salt, and to subject the mixture to sintering and reducing conditions first at temperatures of about 400° C. and then in a second stage at about 1000° C. to form a porous nickel-iron shaped article.

In the accompanying drawing diagrammatically illustrating the invention,

Figure 1:
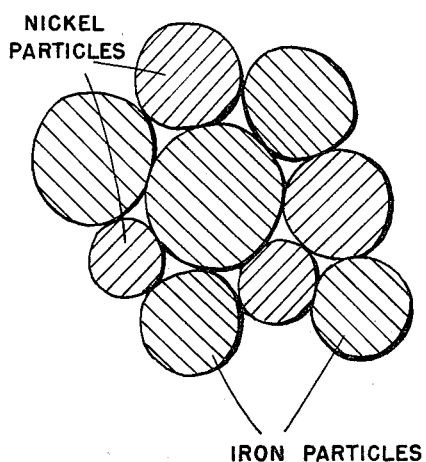
Figure 1 is a sectional view on a greatly enlarged scale of a mixture of iron and nickel particles prior to sintering.
Figure 2:
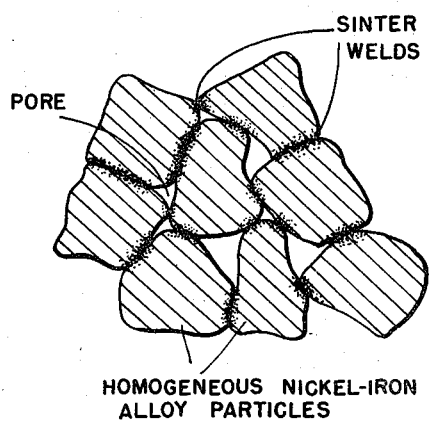
Figure 2 is a corresponding view of a fragmentary portion of a sintered porous carrier body for an alkaline storage battery electrode made according to the invention.
Figure 3:
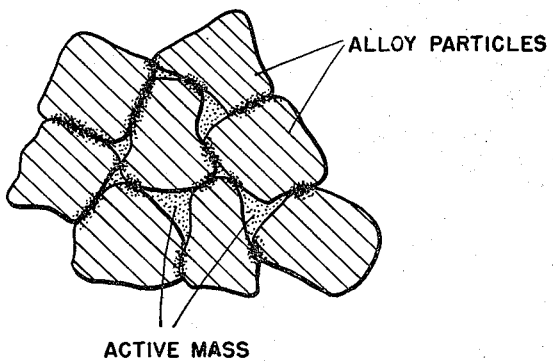
Figure 3 is a corresponding view of a fragmentary portion of an electrode made according to the invention.

Finely divided iron and nickel particles are provided in an intimate mixture, as shown in Figure 1. The mixture is sintered to form a porous carrier body from the individual particles, which become welded at a number of points, a homogeneous porous nickel-iron alloy being produced by diffusion, as illustrated in Figure 2. An active mass such as cadmium hydroxide may then be introduced into the pores of the carrier body, to produce a negative electrode for an alkaline storage battery, as illustrated in Figure 3.

What we claim is:

1. A method of making negative electrodes for accumulators employing alkaline electrolytes which comprises mixing a nickel powder and an iron powder, heating the mixture to sintering temperature in a reducing atmosphere to form a mechanically stable porous body and introducing an active mass into the pores of said body.

2. A method of making negative electrodes for accumulators employing alkaline electrolytes which comprises mixing iron carbonyl and nickel carbonyl, thermally decomposing said mixture to form a fine nickel-iron powder, heating the mixture to sintering temperature in a reducing atmosphere to form a mechanically stable porous body and introducing an active mass into the pores of said body.

3. A method of making negative electrodes for accumulators employing alkaline electrolytes which comprises mixing nickel and iron, one of said metals being in the form of an oxide and the other in the form of metal, heating said mixture in a reducing atmosphere at a slowly increasing temperature to form a sintered, mechanically stable, porous body and introducing an active mass into the pores of said body.

4. A method of making negative electrodes for accumulators employing alkaline electrolytes which comprises precipitating a mixture of nickel hydroxide and iron hydroxide from an aqueous solution containing both nickel salt and iron salt, and heating said mixture in a reducing atmosphere at a slowly increasing temperature between about 400° C. and 1000° C. to form a sintered, mechanically stable, porous body and introducing an active mass into the pores of said body.

5. The method according to claim 1 in which the active mass is cadmium hydroxide.

6. The method according to claim 1 in which the reducing atmosphere is a current of hydrogen.

7. A method of making negative electrodes for accumulators employing alkaline electrolytes which comprises sintering an intimate mixture of finely divided nickel and finely divided iron to form a mechanically stable porous body, and introducing an active mass into the pores of said body.

8. A negative electrode for an alkaline accumulator consisting essentially of a porous alloyed metal body of sintered finely divided iron and nickel containing an active mass in the pores thereof.

9. A negative electrode for an alkaline accumulator consisting essentially of a porous alloyed metal body of sintered finely divided iron and nickel containing cadmium hydroxide in the pores thereof.

10. An electrode for an alkaline storage battery, including a porous carrier body consisting essentially of a sintered porous alloy of finely divided nickel and iron.

11. In a process for the production of an electrode for an alkaline storage battery, the step which comprises sintering an intimate mixture of finely divided nickel and finely divided iron in a reducing atmosphere at a temperature in excess of about 400° C. to produce a porous nickel-iron alloy carrier body for said electrode.

12. In a process for the production of an electrode for an alkaline storage battery, the step which comprises sintering an intimate mixture of finely divided nickel and finely divided iron in a hydrogen atmosphere at a temperature in excess of about 400° C. to produce a porous nickel-iron alloy carrier body for said electrode.

13. In a process for the production of an electrode for an alkaline storage battery, the step which comprises subjecting an intimate mixture of a finely divided nickel compound and a finely divided iron compound to sintering and reducing conditions at a temperature in excess of about 400° C. to produce a porous nickel-iron alloy carrier body for said electrode.

14. A porous carrier body for an electrode for an alkaline storage battery produced by the process of claim 11 and having the shape of said electrode.

References Cited in the file of this patent

UNITED STATES PATENTS

| Number | Name | Date |
|---|---|---|
| 854,200 | Edison | May 21, 1907 |
| 1,506,246 | McMahon | Aug. 26, 1924 |
| 1,988,861 | Thorausch | Jan. 22, 1935 |
| 2,159,231 | Schlecht | May 23, 1939 |
| 2,159,604 | Schlecht | May 23, 1939 |
| 2,172,548 | Schwarzkopf | Sept. 12, 1939 |
| 2,198,042 | Schlecht | Apr. 23, 1940 |
| 2,646,456 | Jacquier | July 21, 1953 |
| 2,646,457 | Jacquier | July 21, 1953 |

FOREIGN PATENTS

| Number | Country | Date |
|---|---|---|
| 419,953 | Great Britain | Nov. 22, 1934 |
| 429,513 | Great Britain | May 31, 1935 |